(No Model.)
E. HAZLEHURST.
TAP.
No. 504,433. Patented Sept. 5, 1893.
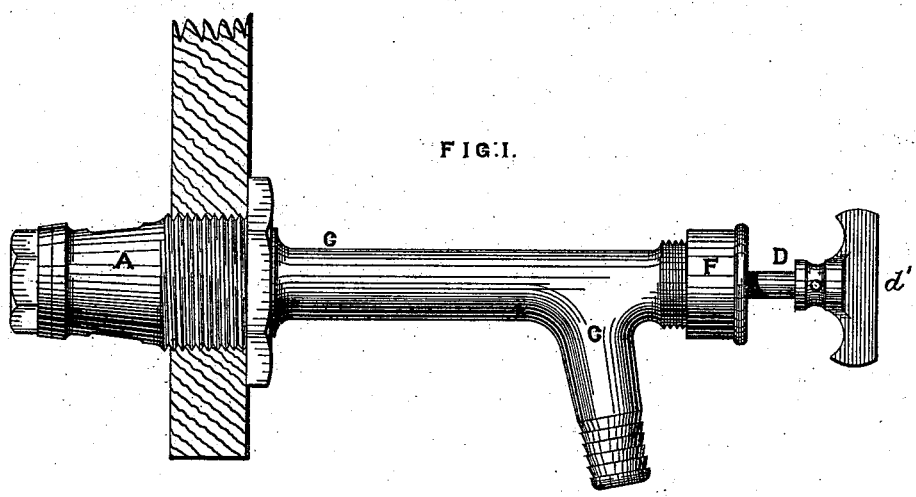
FIG. 1.
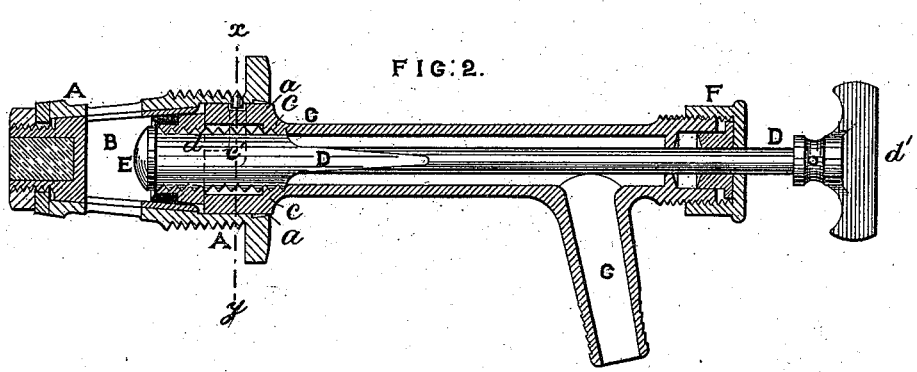
FIG. 2.
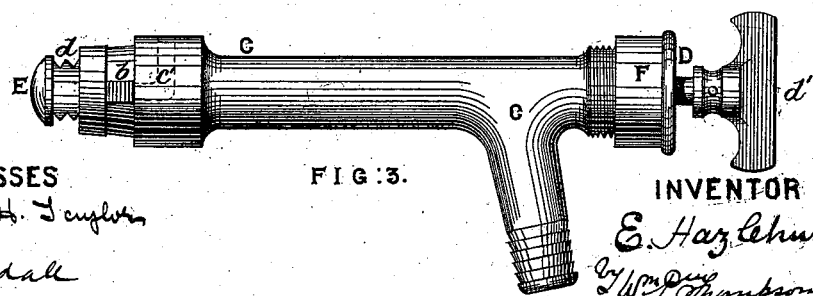
FIG. 5. FIG. 6. FIG. 4.
FIG. 8. FIG. 7.
FIG. 3.
WITNESSES
William H. Taylor
Chas. Ovendale
INVENTOR
E. Hazlehurst
by Wm L Thompson Co
attys.

UNITED STATES PATENT OFFICE.

EDWARD HAZLEHURST, OF OLDHAM, ENGLAND.

TAP.

SPECIFICATION forming part of Letters Patent No. 504,433, dated September 5, 1893.

Application filed October 16, 1891. Serial No. 408,952. (No model.)

*To all whom it may concern:*

Be it known that I, EDWARD HAZLEHURST, of Werneth, Oldham, in the county of Lancaster, England, have invented certain new and useful Improvements in Taps, of which the following is a specification.

This invention relates to improvements in that class of taps in which a hollow delivering faucet is used as a key to open the tap and draw off the liquid and is designed with the object of giving a better and more control over the liquid than in the tap as at present constructed and of preventing the tap being tampered with by unauthorized persons.

It consists essentially in the combination with the tap of a diaphragm or seal which must be removed before the hollow key can be inserted and an auxiliary screw valve which keeps the inner end of the hollow faucet closed and prevents any flow of liquid into or through the hollow faucet after the tap is open until the auxiliary valve has also been opened.

It will be fully described with reference to the accompanying drawings in which as an example I have shown in Figures 1 to 8 a tap suitable for drawing off liquids from a barrel or cask.

Fig. 1 is a front elevation; Fig. 2, a longitudinal section; Fig. 3, a front elevation of hollow key and auxiliary valve; Fig. 4, a transverse section on line $x\,y$ Fig. 2; Fig. 5, a longitudinal section with hollow key removed and sealing disk in position; Fig. 6, a front elevation of sealing disk; Fig. 7, a sectional elevation of sealing disk; Fig. 8, a sectional elevation of sealing disk, showing expanded form the rim takes when forced into the groove provided for it in the tap.

The hollow casing or barrel A of the tap which fits into the tap hole of the vessel or structure to which the tap is applied, and the hollow plug B which fits into the casing or barrel A and with it forms the tap proper are constructed in the usual way and may be formed either with a screw thread or with a flange or other means for securing it in position. The hollow casing or barrel A may be inserted in a cask or other vessel from which liquids are periodically drawn, see Fig. 1. The inner end of the hollow faucet C which forms a key for and fits into the plug B is formed internally with a screw thread $c$ and through the center of the hollow faucet C passes a screwed spindle D which carries at the end a valve E the screw thread $d$ on the spindle corresponding with and engaging with the internal screw thread $c$ of the hollow faucet. The valve E on the end of the spindle D has a seat on the end of the hollow faucet C and is brought to or from its seat by turning the screwed spindle D. The screwed end of the spindle D is of angular form as shown in Fig. 4 to provide space for the liquor to pass through when the valve E is removed from its seat. The other end of the spindle D passes out through a gland or stuffing box F formed at the other end of the hollow faucet C and is provided with a knob or handle $d'$ by which it is turned.

The outer end of the hollow barrel or casing A into which the end of the hollow faucet C fits has formed in it a groove or cavity $a$ with inclined sides to form a dovetail groove, or groove of other shape of greater diameter at the back than at the front. The groove $a$ is formed to receive a metallic seal or diaphragm G. The seal G is dish-shaped as shown the turned up edges $g$ fitting into the groove $a$. When placed in the groove $a$ the edges $g$ of the seal G are expanded by driving them inward until they completely fill the groove $a$ which holds the seat G in position so that it cannot be removed without damaging it or rendering it unfit for further use.

The tap forming the subject of the invention may be applied to any vessel or structure containing gas or liquid which requires to be drawn off at intervals.

In operation the hollow case or barrel A with the plug B fitted in it is connected to the vessel the tap remaining closed until the hollow faucet C is inserted. The sealing disk G is fitted into the groove $a$ in the outer case A which prevents the hollow faucet being inserted and the tap being opened until the seal is removed and as the seal must be damaged or destroyed on being removed any tampering with tap or contents of the vessel is at once detected. When the liquid is required to be withdrawn the sealing disk G is removed and the hollow faucet C is inserted in the pin $b$ on its end engaging with a slot in the hollow plug B, and the bent groove $c'$ with the pin on the fixed outer casing A so that when the key is turned the plug B is turned with it to open the tap and the key cannot be withdrawn without turning it back again and closing the tap. The valve E at the end of the hollow faucet C is then opened by turning the screwed spindle D. The flow of liquid can at any time be stopped without withdrawing the hollow faucet C by closing the valve E.

What I claim, and desire to protect by Letters Patent, is—

1. In a tap the combination with the hollow tapered plug B and the hollow casing A into which the hollow plug fits provided with an inclined groove $a$ at its outer edge in which a sealing disk is secured of a sealing disk G provided with flanged edges $g$ to expand into the groove $a$ to close the entrance to the tap and from which it cannot be removed without damaging the disk substantially as and for the purposes described.

2. In a tap for casks and other vessels the combination with the hollow casing A provided with lateral apertures through which the liquid flows and an inclined groove $a$ at its edge, the hollow tapered plug which rotates therein, the hollow faucet C which forms a key for turning the plug B, the screwed spindle D of rectangular form which engages with internal screw threads in the hollow faucet C, the valve E which closes the inner end of the faucet C and the sealing disk G with flanged edges $g$ which is secured in the inclined groove $a$ substantially as and for the purposes described.

In testimony whereof I have signed my name to this specification in the presence of two subscribing witnesses.

EDWARD HAZLEHURST.

Witnesses:
J. OWDEN O'BRIEN,
CHAS. OVENDALE.